3,645,935
MERCAPTO CARBOXYLIC ACID MODIFIED BUTYL RUBBER

Charles E. Scott, Yardley, Pa., assignor to Cities Service Company, New York, N.Y.
No Drawing. Filed Apr. 23, 1968, Ser. No. 723,574
Int. Cl. C08d 5/04
U.S. Cl. 260—5
19 Claims

ABSTRACT OF THE DISCLOSURE

A modified butyl rubber containing carboxyl groups pendant to the polymer backbone. Butyl rubber is halogenated and the halogenated butyl rubber reacted with a mercapto carboxylic acid. Substitution of at least part of the halogen by the mercapto carboxylic acid occurs, presumably through the mercaptan group.

BACKGROUND OF THE INVENTION

Field of the invention

This invention relates to chemically modified butyl rubber and more particularly to mercapto carboxylic acid modified butyl rubber having excellent curing properties and other desirable characteristics. In accordance with the invention, a halogenated butyl rubber is reacted with a mercapto carboxylic acid whereby carboxyl groups are introduced pendant to the polymer chain. The butyl so modified is readily cured by metal oxides, exhibits improved adhesion to polar group-containing fiber and has enhanced compatibility with unsaturated elastomers.

Description of the prior art

The term "butyl rubber" as used herein and in the appended claims is intended to designate vulcanizable rubbery copolymers of low unsaturation such as are produced by copolymerizing a major proportion of an iso-olefin of 4 to 7 carbon atoms with a minor proportion of a multiolefin of 4 to 8 carbon atoms. The usual preferred isoolefin is isobutylene although other iso-olefins such as 3-methyl-1-butene may be employed. Multiolefins suitable for this purpose are preferably conjugated diolefins such as isoprene, butadiene, and the like.

These butyl rubber copolymers are usually prepared by copolymerizing about 0.5 to 15 percent by weight of conjugated diolefin, preferably isoprene, with about 85 to 99.5 percent by weight of isobutylene at a reaction temperature below about —100° F. and in the presence of a Friedel-Crafts catalyst, perferably AlCl$_3$, dissolved in a low-freezing, non-complex forming solvent such as methyl chloride. Copolymers produced by reacting 95 to 99.5 weight percent isobutylene with 0.5 to 5 weight percent of isoprene have been found to be particularly desirable. Generally, the butyl rubber has a Staudinger molecular weight between about 20,000 and 300,000 or higher and a Wijs iodine number of about 0.5 to 50.

Butyl rubber has many desirable properties, for example, superior aging characteristics and low gas permeability. However, it has certain deficiencies such as slow reactivity to vulcanizing agents, incompatibility with natural rubber, and poor cord adhesion.

SUMMARY OF THE INVENTION

It is, therefore, an object of the present invention to increase the cure rate of butyl rubber without sacrificing the desirable properties.

Another object is to improve adhesion of butyl rubber to polar group-containing fibers such as cellulosic and nylon tire cord.

Still another object is to improve the compatibility of butyl rubber with natural rubber, as well as other highly unsaturated elastomers.

It is well known that halogenation of butyl/rubber brings about a number of desirable properties, among which is curability with zinc oxide. It has now been discovered that introduction of carboxylic acid molecules pendant to the backbone of the butyl rubber polymer enhances curability with metal oxides relative to halogenated butyl rubber. In fact, the carboxylic acid-modified butyl rubber, unlike halogenated butyl or conventional butyl rubber, is cured to a tight vulcanizate using magnesium oxide alone. Furthermore, butyl rubber so modified exhibits faster cure with sulfur and better vulcanizate properties than is the case with either halogenated butyl or conventional butyl.

In the practice of my invention, a halogenated butyl rubber is reacted with a mercapto carboxylic acid containing at least one carboxyl group such as thioglycolic acid, thiolactic acid, mercapto malonic acid, or mercapto succinic acid. The reaction can be acomplished by halogenating butyl rubber in solution followed by addition of a mercapto carboxylic acid and heating the solution. Substitution of at least part of the halogen by mercapto carboxylic acid molecules occurs via an alkylation type reaction, presumably through the mercaptan group. The mercapto carboxylic acid-modified butyl rubber is then recovered from solution by any one of a number of known methods, for example by flashing off the solvent with hot water or by pouring the solution into a non-solvent for the rubber which causes coagulation of said rubber.

Alternately, the reaction may be carried out by mixing a prehalogenated butyl rubber with a mercapto carboxylic acid using a rubber mill or an internal mixer. The mix is then heated to complete the reaction.

My process differs from that disclosed in U.S. 3,297,660 wherein a mercapto-substituted carboxylic acid is merely added to a chloroprene polymer prior to curing with a metal oxide such as zinc oxide or magnesium oxide. In the practice of my invention, the mercapto carboxylic acid is added to and reacted with halogenated butyl rubber prior to vulcanization. In fact, if the mercapto carboxylic acid is merely added to the halogenated butyl rubber prior to curing with a metal oxide in a process analogous to that taught in U.S. 3,297,660, the physical properties of the vulcanizate are much poorer than is the case when operating under the process of the instant invention.

It is generally desirable to use a chlorinated butyl rubber as the halogenated butyl in the preparation of the mercapto carboxylic acid-modified butyl rubber. Chlorination of butyl rubber occurs preferentially in the allylic positions, hence most of the olefinic unsaturation in the polymer backbone is retained and is available for subsequent crosslinking. It is advantageous to use a chlorinated butyl rubber containing about 0.5 to about 3% by weight of chlorine and preferably about 1 to about 2 weight percent chlorine. The chlorinated butyl is then reacted with about 0.5 to about 2 moles of mercapto carboxylic acid per equivalent of chlorine in the rubber. The preferred ratio is about 1 to about 1.5 moles of mercapto carboxylic acid per equivalent of chlorine in the chlorinated butyl. When the reaction between chlorinated butyl and mercapto carboxylic acid is carried out in solution, it is convenient to run the reaction at a temperature that does not exceed the boiling point of the solution. On the other hand, when the mercapto carboxylic acid is mixed with prechlorinated butyl rubber on a mill or in an internal mixer, it is advantageous to complete the reaction by heating the mix for about 30 to about 90 minutes at a temperature of about 250° F. to about 350° F. The preferred procedure is to heat the mix for about 60 minutes at about 307° F.

DESCRIPTION OF PREFERRED EMBODIMENTS

Example I

A solution with a solids content of 10% by weight was prepared by dissolving 100 g. of butyl rubber having a Mooney Viscosity of 70 and 1 to 2 mole percent unsaturation in 1025 ml. of benzene. The stirred solution was heated on a hot water bath to 40° C. and chlorine gas was bubbled below the surface of the liquid at a rate of 100 ml./min. for 25 minutes to give 1.3 weight percent bound chlorine, equal to about 0.0366 equivalent of chlorine. The stirred, warm solution was then sparged with nitrogen to remove excess chlorine and gaseous hydrogen chloride. To the reaction mixture was added 4.0 g. (0.0377 mole) of thiolactic acid and the resultant solution was stirred under reflux for 2 hours. The reaction mixture was poured into a large volume of methanol and the carboxylated rubber coagulated. The polymer was dried in a vacuum oven at 60° C. The yield was 104 g. of thiolactic acid-modified butyl rubber containing 1.2 weight percent sulfur, indicating substantially complete substitution of chlorine by thiolactic acid. The product had essentially the same Mooney viscosity and unsaturation as the original butyl rubber.

Example II

A 100 g. sample of chlorinated butyl rubber prepared according to the procedure of Example 1 and containing 1.3% by weight (0.0366 equivalent) of bound chlorine was placed on a two roll mill and 4.0 g. (0.0377 mole) of thiolactic acid added. The acid was incorporated in approximately 5 minutes. The sample was milled an additional 5 minutes to insure intimate mixing. The stock was then heated in a curing press for 1 hour at 307° F. The modified butyl was cooled and then removed from the press. Unreacted thiolactic acid was removed by washing and the rubber dried by milling at 220° F. until the sample reached constant weight. The yield was 102.7 g. of thiolactic acid-modified butyl rubber containing 1.2% by weight of sulfur, indicating substantially complete substitution of chlorine by thiolactic acid. The product had essentially the same Mooney viscosity and unsaturation as the original butyl rubber.

Example III

The curability with zinc oxide of the thiolactic acid-modified butyl rubber of Example 1 was compared to that of the chlorinated precursor prepared as in Example I and containing 1.3 weight percent chlorine and to that of the original butyl rubber sample. The three samples of rubber were compounded as shown in the table and cured at 307° F. for 60 minutes. Also shown in the table are the stress-strain properties of each vulcanizate after 60 minutes at 307° F.

|  | Thillactic acid-modified butyl | Chlorinated butyl | Conventional butyl |
| --- | --- | --- | --- |
| Components, parts: |  |  |  |
| Polymer | 100 | 100 | 100 |
| HAF black | 50 | 50 | 50 |
| Zinc oxide | 5 | 5 | 5 |
| Stress-strain properties; 60″ at 307° F.: |  |  |  |
| Tensile, p.s.i. | 2,485 | 2,105 | (¹) |
| Percent elongation | 165 | 420 |  |
| Shore Hardness | 67 | 50 |  |

¹ No cure.

The thiolactic acid-modified butyl rubber exhibited a higher degree of cure than did chlorinated butyl as evidenced by its higher tensile strength and lower elongation. The unmodified butyl rubber control did not undergo vulcanization at all.

Example IV

Samples of the thiolactic acid-modified butyl of Example I, the chlorinated butyl prepared as in Example I and containing 1.3 weight percent chlorine, and the original unmodified butyl rubber were compounded according to the standard sulfur recipe below:

|  | Parts |
| --- | --- |
| Polymer | 100 |
| Zinc oxide | 5 |
| Tetramethylthiuram disulfide | 1 |
| Mercaptobenzothiazole | 1 |
| Sulfur | 2 |
| HAF black | 50 |

Each mix was cured at 307° F. for 45 minutes. The stress-strain properties were as shown in the table.

| Stress-strain properties, 45″ at 307° F. | Thiolactic acid-modified butyl | Chlorinated butyl | Conventional butyl |
| --- | --- | --- | --- |
| 300% Modulus, p.s.i. | 2,530 | 1,930 | 1,625 |
| Tensile, p.s.i. | 2,780 | 2,775 | 2,615 |
| Percent elongation | 325 | 445 | 465 |
| Shore Hardness | 54 | 58 | 64 |

It is seen that the thiolactic acid-modified butyl rubber developed a higher 300% modulus than did either the chlorinated butyl or the conventional butyl. The thiolactic acid-modified butyl vulcanizate also had a tensile greater than that of the conventional butyl vulcanizate and as high as that of the vulcanized chlorinated butyl. Further evidence of a higher degree of cure is that the acid-modified butyl vulcanizate had a lower elongation than did the vulcanizates of either chlorinated butyl or conventional butyl.

Example V

Samples of the thiolactic acid-modified butyl of Example II, chlorinated butyl prepared as described in Example I and containing 1.3 weight percent chlorine, and the original unmodified butyl rubber were subjected to cure with magnesium oxide as the vulcanizing agent. The recipe for each of the three samples was as follows:

|  | Parts |
| --- | --- |
| Polymer | 100 |
| HAF black | 50 |
| Magnesium oxide | 5 |

Each mix was cured at 307° F. for 60 minutes. The stress-strain properties were as shown in the table.

| Stress-strain properties, 60″ at 307° F. | Thiolactic acid-modified butyl | Chlorinated butyl | Conventional butyl |
| --- | --- | --- | --- |
| 300% modulus, p.s.i. | 2,380 | 245 | No cure. |
| Tensile, p.s.i. | 2,505 | 275 |  |
| Percent elongation | 325 | 775 |  |
| Shore Hardness | 66 | 47 |  |

The results show that the thiolactic acid-modified butyl rubber gave a vulcanizate with good stress-strain properties when cured with magnesium oxide alone while conventional butyl did not cure at all and chlorinated butyl underwent negligible cure.

Example VI

A solution of 100 g. of butyl rubber having a Mooney Viscosity of 70 and 2 mole percent unsaturation was prepared by dissolving the rubber in 1025 ml. of benzene. The rubber was chlorinated as in Example I to a chlorine content of 1.3 weight percent, equal to 0.0366 equivalent of bound chlorine. To the solution was added 5.2 g. (0.038 mole) of mercapto malonic acid, and the reaction mixture was stirred under reflux for 2.5 hours. The polymer was coagulated by pouring the reaction mixture into a large volume of methanol and the coagulated rubber was dried in a vacuum oven at 60° C. The yield was 104 g. of mercapto malonic acid-modified butyl rubber containing 1.1% by weight of sulfur, indicating substantially complete replacement of chlorine by mercapto malonic acid.

Example VII

A sample of the mercapto malonic acid-modified butyl of Example VI and a sample of the original unmodified butyl rubber were compounded according to the standard sulfur recipe of Example IV. The samples were cured at 307° F. and the stress-strain properties of the vulcanizates determined at intervals. The results are shown in the table.

|  | Mercapto malonic acid-modified butyl rubber | Conventional butyl |
|---|---|---|
| 300% modulus, p.s.i.: |  |  |
| 10 min | 1,100 | 400 |
| 15 min | 1,650 | 600 |
| 30 min | 1,840 | 1,000 |
| 45 min | 1,900 | 1,300 |
| 60 min | 2,000 | 1,625 |
| Tensile, p.s.i.: |  |  |
| 10 min | 2,050 | 700 |
| 15 min | 2,800 | 2,100 |
| 30 min | 2,750 | 2,600 |
| 45 min | 2,700 | 2,500 |
| 60 min | 2,800 | 2,500 |

The data show that the mercapto malonic acid-modified butyl rubber developed a 300% modulus and tensile strength faster than did conventionsl butyl in the standard sulfur cure system. The acid-modified butyl not only cured faster than did conventional butyl in this system, but the higher modulus and tensile show a greater degree of cure.

Example VIII

A 100 g. sample of chlorinated butyl prepared according to the procedure of Example I and containing 1.3 weight percent (0.0366 equivalent) of bound chlorine was placed on a two roll mill, 5.2 (0.038 mole) of mercapto malonic acid were added, and the mixture was thoroughly mixed. The stock was then heated, washed, and dried by the procedure of Example II. The yield was 103.8 g. of mercapto malonic acid-modified butyl rubber containing 1.1 weight percent sulfur, indicating essentially complete substitution of chlorine by the acid.

A sample of the above mercapto malonic acid-modified butyl and a sample of the chlorinated butyl used as the starting material in its preparation were subjected to vulcanization with magnesium oxide as the curative. The recipe was that shown in Example V. Each mix was cured at 307° F. for 60 minutes. The stress-strain properties of the vulcanizates are set forth in the table.

| Stress-strain properties, 60" at 307° F. | Mercapto malonic acid-modified butyl | Chlorinated butyl |
|---|---|---|
| 300% modulus, p.s.i | 2,000 | 240 |
| Tensile, p.s.i | 2,200 | 300 |
| Percent elongation | 310 | 770 |
| Shore Hardness | 64 | 45 |

The data illustrate that the mercapto malonic acid-modified butyl when cured with magnesium oxide alone yielded a vulcanizate with good stress-strain properties while the chlorinated butyl underwent negligible cure.

Example IX

Blends of 50 percent natural rubber and 50 percent each of the thiolactic acid-modified butyl of Example II, chlorinated butyl prepared as in Example I and containing 1.3% chlorine by weight, and unmodified butyl rubber were prepared. Each blend was compounded according to the standard sulfur recipe below:

| | Parts |
|---|---|
| Natural rubber blend | 100 |
| Zinc oxide | 5 |
| Tetramethylthiuram disulfide | 1 |
| Mercaptobenzothiazole | 1 |
| Sulfur | 1 |
| HAF black | 50 |

Each mix was cured at 307° F. for 45 minutes. The stress-strain properties were as shown in the table.

| Stress-strain properties, 45" at 307° F. | Natural rubber blend with thiolactic acid-modified butyl | Natural rubber blend with chlorinated butyl | Natural rubber blend with conventional butyl |
|---|---|---|---|
| Tensile, p.s.i | 2000 | 1810 | 800 |
| percent elongation | 165 | 165 | 205 |
| Shore Hardness | 71 | 70 | 65 |

The data in the table show that a 50/50 blend of thiolactic acid-modified butyl and natural rubber, when compounded according to the standard sulfur recipe and cured, gave a vulcanizate with a higher tensile than did a similar blend of chlorinated butyl and natural rubber that was vulcanized in the same manner. In comparison, a 50/50 blend of conventional butyl and natural rubber underwent negligible cure when compounded and cured under these same conditions.

Example X

A sample of chlorinated butyl rubber prepared according to the procedure of Example I and containing 1.3 weight percent chlorine was compounded according to the following recipe and designated masterbatch A:

| | Parts |
|---|---|
| Chlorinated butyl rubber | 100 |
| HAF black | 50 |
| Magnesium oxide | 5 |
| Thiolactic acid | 4 |

In comparison, a thiolactic acid-modified butyl rubber was prepared according to the procedure of Example II by reacting 4.0 g. of thiolactic acid with 100 g. of chlorinated butyl rubber containing 1.3 weight percent chlorine. The product, containing 1.2 weight percent sulfur, was compoundsd according to the following recipe and designated masterbatch B:

| | Parts |
|---|---|
| Thiolactic acid-modified butyl | 102.5 |
| HAF black | 50 |
| Magnesium oxide | 5 |

Both masterbatches were vulcanized at 307° F. for 45 minutes. The physical properties of the respective vulcanizates are shown in the following table:

| | Masterbatch A | Masterbatch B |
|---|---|---|
| 300% modulus, p.s.i | 600 | 2,380 |
| Tensile, p.s.i | 620 | 2,500 |
| Percent elongation | 380 | 325 |
| Shore Hardness | 56 | 60 |

The foregoing illustrates that it is necessary to prereact the mercapto carboxylic acid with the halogenated butyl rubber prior to vulcanization with the metal oxide in order to get optimum cure. Merely having the mercapto carboxylic acid present in the halogenated butyl rubber-carbon black-metal oxide masterbatch during vulcanization in a procedure analogus to that disclosed in U.S. 3,297,660 does not give the desirable results obtained by operating under the conditions of the present invention.

Therefore, what is claimed is:

1. Elastomeric substitution product of reacting halogenated butyl rubber with an acid having a mercapto group and at least one carboxyl group, said substitution product containing up to 0.085 mole of said acid per 100 grams of said rubber and wherein the carboxyl groups of said acid are pendant to the polymer backbone, said acid being substituted for the halogen in said rubber.

2. The elastomer product of claim 1 in which the acid substituted for the halogen is thiolactic acid.

3. The elastomeric product of claim 1 in which the acid substituted for the halogen is mercapto malonic acid.

4. A process for providing an elastomeric composition having improved curing characteristics and vulcanizate properties which comprises substituting up to about 0.085 mole of an acid having a mercapto group and at least one carboxyl group for the halogen in each 100 grams of an elastomeric copolymer of a major proportion of an iso-olefin of 4 to 7 carbon atoms and a minor proportion of a multiolefin of 4 to 8 carbon atoms and having halogen in the allylic positions of the polymer molecule.

5. The process of claim 4 in which said acid is thiolactic acid.

6. The process of claim 4 in which the said acid is mercapto malonic acid.

7. A process for preparing an elastomeric copolymer of a major proportion of an iso-olefin of 4 to 7 carbon atoms and a minor proportion of a multiolefin of 4 to 8 carbon atoms having improved curing characteristics and vulcanizate properties which comprises incorporating into said elastomeric copolymer about 0.5% to about 3% by weight of bound halogen and substituting the halogen in the halogenated elastomer, prior to vulcanization, with about 0.5 to about 2.0 moles of a mercapto carboxylic acid per equivalent of bound halogen, said acid having a mercapto group and at least one carboxyl group.

8. The process of claim 7 in which the iso-olefin is isobutylene, the multiolefin is isoprene and the halogen is chlorine.

9. The process of claim 8 in which chlorination of the copolymer is carried out by introducing chlorine into a solution of the copolymer, the mixture is heated to bring about substitution of the chlorine in the chlorinated elastomer with the mercapto carboxylic acid and the resultant elastomeric product is removed from the solution.

10. The process of claim 8 in which the chlorinated elastomeric copolymer and the mercapto carboxylic acid are subjected to high shear mixing and the resulting mixture is heated sufficiently to effect substitution of the acid with the chlorine in said copolymer.

11. The process of claim 7 in which the mercapto carboxylic acid is thiolactic acid.

12. The process of claim 7 in which the mercapto carboxylic acid is mercapto malonic acid.

13. A process for producing an elastomeric copolymer of a major proportion of isobutylene and a minor proportion of isoprene having improved characteristics which comprises the steps incorporating into said elastomer from about 0.5% to about 3% by weight of bound chlorine at the allylic positions of the polymer molecule, adding about 1 to about 1.5 moles of a mercapto carboxylic acid per equivalent of bound chlorine in the elastomer, said acid having a mercapto group and at least one carboxyl group, vigorously milling the mixture, substituting said carboxylic acid for the chlorine in said copolymer by heating the stock for about 30 to about 90 minutes at a temperature of about 250° F. to about 350° F., removing unreacted mercapto carboxylated acid from the resulting stock by washing, and then drying the washed stock.

14. A vulcanizable composition comprising a blend of a highly unsaturated rubber and an elastomeric substitution product of reacting halogenated butyl rubber with an acid having a mercapto group and at least one carboxyl group, said substitution product containing up to 0.085 mole of acid per 100 grams of said rubber and wherein the carboxyl groups of said acid are pendant to the polymer backbone, said acid being substituted for the halogen of said butyl rubber.

15. The vulcanizable composition of claim 14 in which the highly unsaturated elastomer is natural rubber.

16. The vulcanizable composition of claim 21 in which the mercapto carboxylic acid is thiolactic acid.

17. A vulcanizable composition comprising:
(a) an elastomeric substitution product of reacting halogenated butyl rubber with an acid having a mercapto group and at least one carboxyl group, said substitution product containing up to 0.085 mole of said acid per 100 grams of said rubber and wherein the carboxyl groups of said acid are pendant to the polymer backbone, said acid being substituted for the halogen of said rubber,
(b) carbon black in quantity sufficient to significantly reinforce the composition, and
(c) a metal oxide curing agent sufficient in quantity to vulcanize the composition.

18. The vulcanizable composition of claim 17 in which the metal oxide is from the group consisting of zinc oxide and magnesium oxide.

19. The vulcanizable composition of claim 17 in which the content of carbon black is about 50 parts by weight of the composition and the content of the metal oxide curing agent is about 5 parts by weight of the composition.

References Cited

UNITED STATES PATENTS

| | | | |
|---|---|---|---|
| 3,257,373 | 6/1966 | Kraus et al. | 260—94.7 |
| 3,264,273 | 8/1966 | Greenlee | 260—79.5 |
| 3,297,660 | 1/1967 | Becket | 260—79.7 |
| 3,312,656 | 4/1967 | Einhorn et al. | 260—79.5 |
| 3,342,789 | 9/1967 | Bannister et al. | 260—79.5 |
| 2,662,874 | 12/1953 | Brown | 260—79.5 |

FOREIGN PATENTS

| | | | |
|---|---|---|---|
| 538,730 | 11/1953 | Canada | 260—5 |

JOHN C. BLEUTGE, Primary Examiner

U.S. Cl. X.R.

260—41.5 R, 79, 79.5 NV, 85.3 C, 85.3 H